United States Patent Office 3,216,294
Patented Nov. 9, 1965

3,216,294
HIGH SPEED BAR TURNING MACHINES
Richard P. Jennings, Hale, England, assignor to Sir James Farmer Norton & Co. Limited, Salford, England, a British company
Filed Oct. 23, 1963, Ser. No. 318,378
Claims priority, application Great Britain, Oct. 25, 1962, 40,474/62
2 Claims. (Cl. 82—38)

This invention has for its object to provide improved means for supporting or steadying the work which is being machined in a bar turning machine. The work may be in bar or tube form and our improved supporting or steadying means may be arranged either before or after or both before and after the cutting tool.

According to the present invention, there is provided a steady for a bar turning machine comprising an annular device adapted to surround the work to be machined, and comprising a plurality of pads disposed radially around an axis, which pads are moved radially against the work by hydraulic pressure.

Preferably the steady further comprises a collet holder having a plurality of radially extending slots in which are accommodated a corresponding number of pads each of which is provided with inclined surface means in engagement with complementary inclined surface means on an annular member so arranged that axial movement of the said annular member causes radial movement of the pads, movement of the annular member in a direction to move the pads inwards being effected by hydraulic pressure means.

An embodiment of the invention will now be described, by way of example, with reference to the accompanying drawings, in which.

Figure 1:
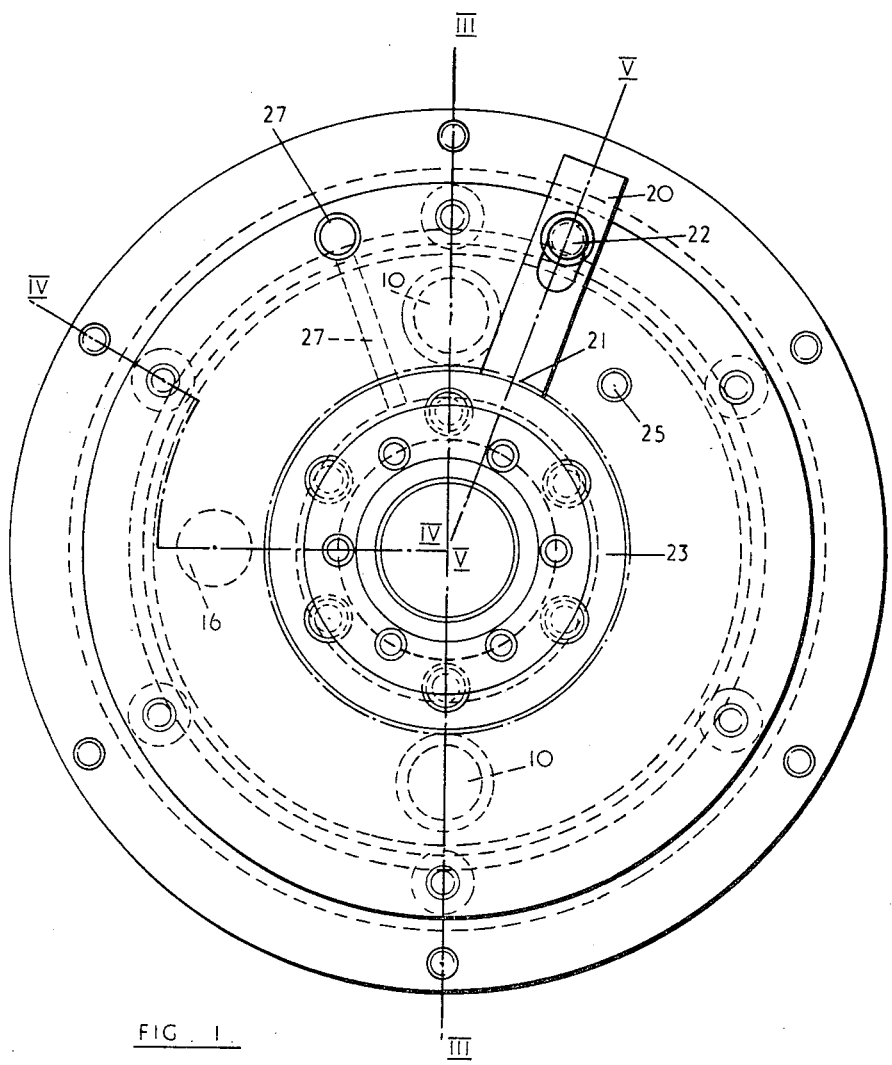
FIGURE 1 is a view from one end of a steady in accordance with the invention.
Figure 2:
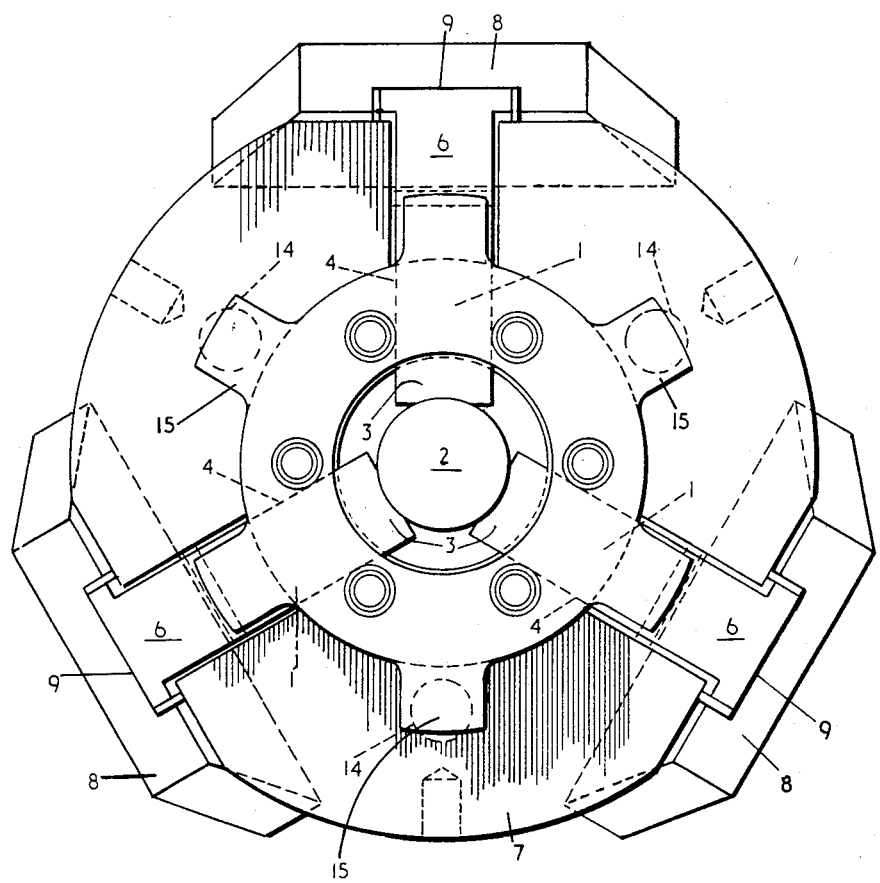
FIGURE 2 is a view from the other end.

The steady shown comprises three equally spaced pads 1 disposed radially around the work 2.

The pads 1 have radiused operative ends 3 to conform roughly to the work size and are guided in three equally spaced radial slots 4 in a collet holder 5. The pads are hard faced at the ends 3 and at their outer ends are secured to steady holders 6 passing through three equally spaced slots in a steady guide support 7. The latter is provided with three angled plates 8 with faces 9 adapted to press against the ends of the three steady holders 6. Thus when an axial movement is imparted to the steady guide support 7 which is disposed axially around the collet holder 5, a radial movement is imparted to the steady pads 1.

Figure 3:
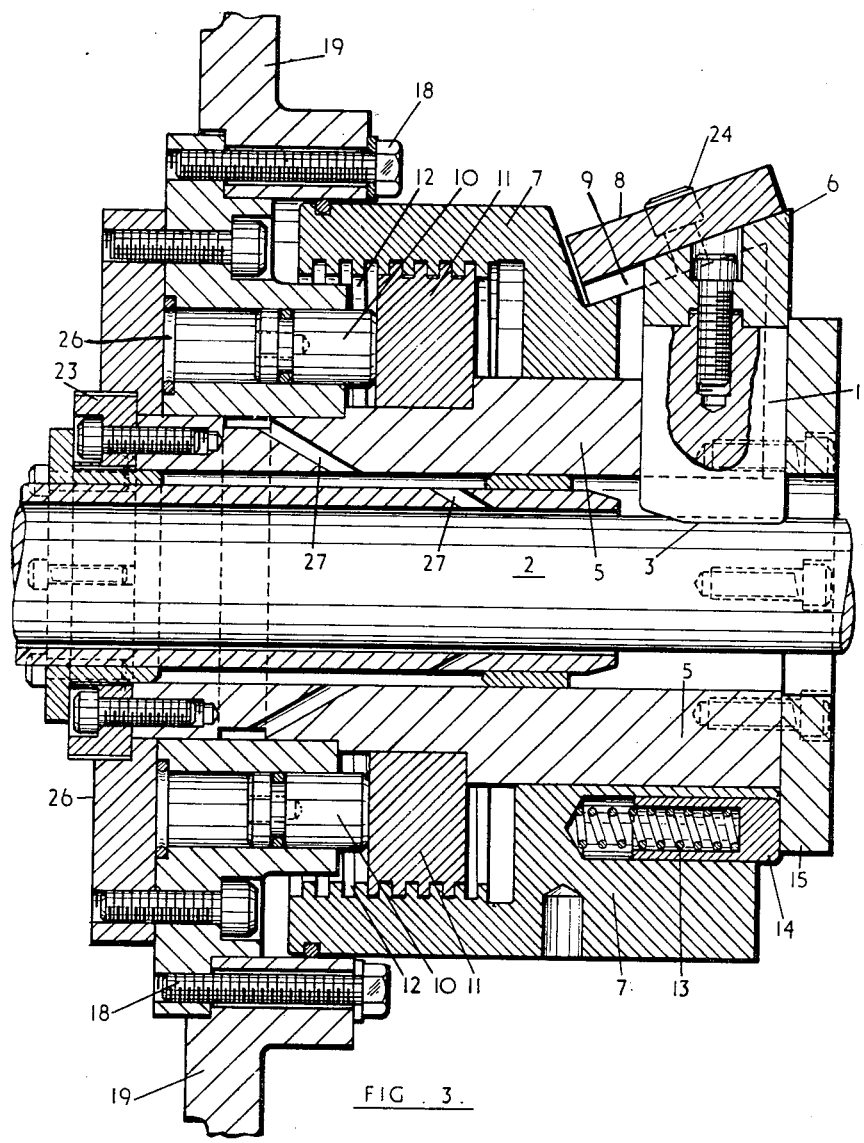
FIGURE 3 is a section taken on the line III—III of FIGURE 1.
Figure 4:
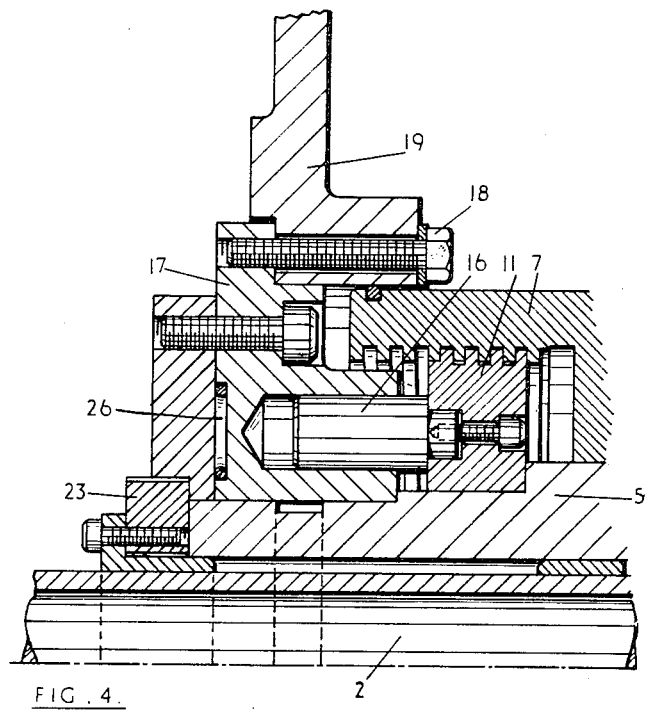
FIGURE 4 is a section taken on the line IV—IV of FIGURE 1.
Figure 5:
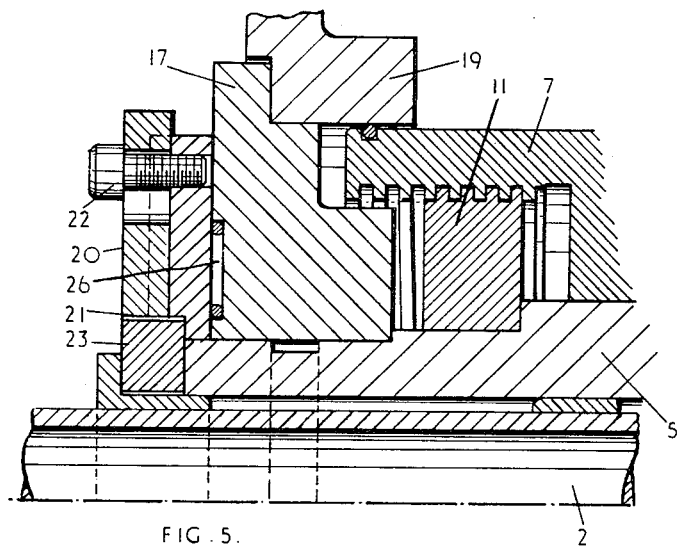
FIGURE 5 is a section taken on the line V—V of FIGURE 1.

The aforesaid axial movement of the steady guide support 7 for moving the steady pads 1 on to the work 2 is obtained by admitting hydraulic oil under pressure, via a port 25 and annular duct 26, to two pistons 10 which act upon a part 11 which threads into the internal surface 12 of the steady guide support 7. A plurality of springs 13 and associated plungers 14 disposed in the steady guide support 7 at the end opposite to that upon which the hydraulic pistons 10 act press upon a fixed end plate 15 secured to the collet holder 5 and so tend to move the steady guide support 7 in a direction towards the left (FIGURE 3) to allow the steady pads 1 to move outwards when the hydraulic pressure is relieved.

The part 11 which threads in the steady guide support 7 provides means for adjusting the steady pads 1 to compensate for wear at the ends 3 of the pads which make contact with the work and also to accommodate different work diameters. This part 11 is prevented from rotating by means of a peg 16 which is carried in a stationary member 17 secured by bolts 18 to a headstock 19. In order to make a radial adjustment to the steady pads 1, a locking plate 20 at the inner end of which are cut serrated teeth 21 is released by its clamping screw 22 and moved radially outwards. The serrated teeth 21 are now out of engagement with similar serrated teeth cut on the periphery of a ring 23 which is secured to the collet holder 5. Steady guide support 7 may now be rotated, and thus will move axially since the part 11 is held from rotation. This axial movement of the steady guide support 7 will cause the steady pads 1 to move radially.

A series of screws 24 securing plates 8 to the steady guide support 7, when removed will allow these plates 8 to be removed thus giving access to the outer ends of steady holders 6 and steady pads 1. Sets of steady pads are provided to cover different ranges of work sizes.

Coolant is admitted to the work via passageways 27 in the stationary member 17 and collet holder 5.

In an alternative arrangement of the invention, the end surfaces 3 of the steady pads 1 are provided with longitudinal V-shaped tenons cut in a direction parallel to the axis of the work 2. These tenons are angularly positioned so as to engage with corresponding grooves which have been rolled into the work, for example by means of grooved feeding rolls, as the work is being fed into the steady. The function of this alternative arrangement is, in addition to supporting and steadying the work, to provide a torque restraining means in order to resist the cutting torque, and also to prevent torsional vibration in the work.

A steady in accordance with the invention has the following advantages:
 (a) The gripping load may be readily adjusted
 (b) The steady pads may be opened out for easy removal of work in case of tool breakage
 (c) The hydraulic medium for applying pressure provides efficient means for damping out cutting vibration
 (d) The steady pads can be readily adjusted for work of different diameters and
 (e) The simple construction of the steady pads and the provision for ready adjustment contribute to economical working of the bar turning machine.

What I claim is:
1. A steady for a bar turning machine comprising a collet holder adapted to surround the work to be machined and having a plurality of radially extending slots, a pad accommodated in each slot and provided with inclined surface means, an annular member provided with complementary inclined surface means in engagement with the pads inclined surface means and so arranged that axial movement of the said annular member causes radial movement of the pads, and hydraulic pressure means for moving the annular member in a direction to move the pads inwards, the hydraulic pressure means comprising a plurality of hydraulic pistons, and a part on which the pistons bear and which threadedly engages the annular member and is thereby axially adjustable with respect to the annular member.

2. A steady for a bar turning machine comprising a collet holder adapted to surround the work to be machined and having a plurality of radially extending slots, a pad accommodated in each slot and provided with inclined surface means, an annular member provided with complementary inclined surface means in engagement with the pads inclined surface means and so arranged that axial movement of the said annular member causes radial movement of the pads, and hydraulic pressure means for moving the annular member in a direction to move the pads inwards, the hydraulic pressure means comprising a plurality of hydraulic pistons, a part on which the pistons bear and which threadedly engages the annular member and is thereby axially adjustable with respect to the annular member, and releasable means to lock the said part and the said annular member against relative rotation.

References Cited by the Examiner

UNITED STATES PATENTS

| | | | |
|---|---|---|---|
| 2,427,322 | 9/47 | Darner | 82—20 |
| 2,697,610 | 12/54 | Ovshinsky | 279—4 |
| 2,845,827 | 8/58 | Brauer | 82—20 |
| 2,860,881 | 11/58 | Perrachione | 279—121 X |

FOREIGN PATENTS 1,107,731    8/55    France.

WILLIAM W. DYER, Jr., *Primary Examiner*.